Jan. 19, 1960 S. E. RICHESON 2,921,714
INSTALLATION FOR DISPENSING SEVERAL BEVERAGES
Original Filed June 16, 1955 2 Sheets-Sheet 1

INVENTOR.
SANFORD E. RICHESON
BY
ATTORNEYS

Jan. 19, 1960 S. E. RICHESON 2,921,714
INSTALLATION FOR DISPENSING SEVERAL BEVERAGES
Original Filed June 16, 1955 2 Sheets-Sheet 2
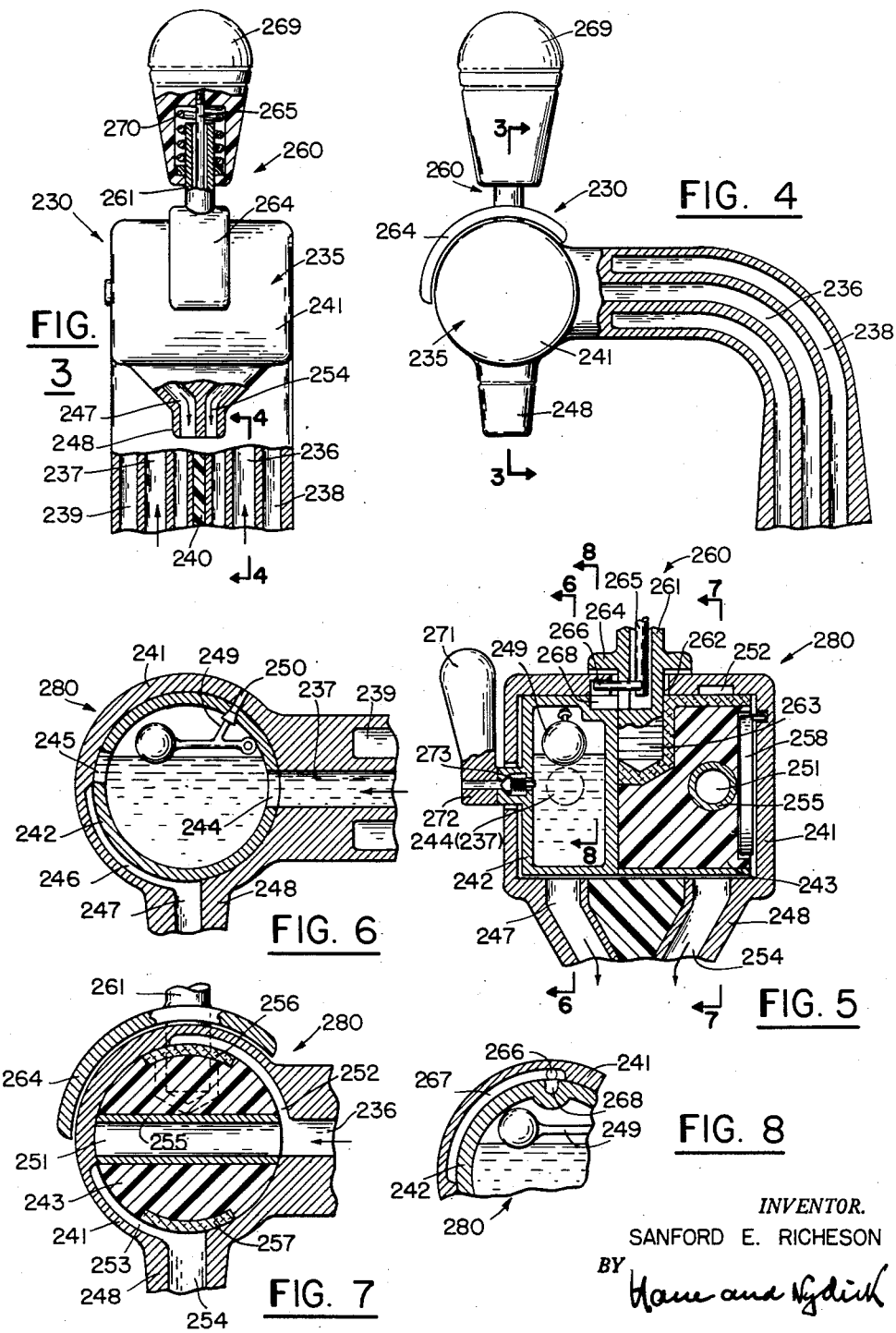
INVENTOR.
SANFORD E. RICHESON
BY
ATTORNEYS United States Patent Office 2,921,714
Patented Jan. 19, 1960

2,921,714

INSTALLATION FOR DISPENSING SEVERAL BEVERAGES

Sanford E. Richeson, Brooklyn, N.Y.

Original application June 16, 1955, Serial No. 515,939, now Patent No. 2,827,845, dated March 25, 1958. Divided and this application January 21, 1958, Serial No. 710,224

8 Claims. (Cl. 222—67)

The present invention relates to an installation for dispensing several beverages, either in mixture or separately and independently.

While the installation according to the invention is suitable for the dispensation of a variety of beverages and even other liquids, it is primarily designed to dispense coffee or tea and cream or milk. Its particular field of application is by users that are substantial consumers such as restaurants, institutions, etc.

The present application is a divisional application divided out of my co-pending application Serial No. 515,939, filed June 16, 1955 and issued as Patent 2,827,845 on March 25, 1958. The beverage brewing machine as described in the parent application is suitable as supply of one of the beverages such as coffee to be dispensed by means of the installation to the present invention, but any other suitable source of supply may also be used.

One of the objects of the present invention is an installation of the general kind above referred to, which permits the dispensation of the beverages either in mixture or separately at one or several tap points in a simple and convenient fashion. The provision of multiple tap points affords the advantage of expediting the serving of coffee or other beverages to the customers, which is of particular importance during the busy hours of a restaurant or similar institution.

Another object of the invention is to provide an installation which is capable of dispensing at the same tap point either coffee or milk and cream, or a mixture of coffee and milk or cream as requested by a customer. Obviously, this versatility also tends to expedite service.

Still another object of the invention is to provide an installation in which the beverages are automatically kept at the suitable temperatures, that is, coffee, etc. is kept hot and milk or cream is kept cold.

A further object of the invention is to provide an installation which continuously checks its supply of beverage and automatically initiates the necessary operations to maintain an adequate supply.

Other and further objects, features and advantages of the invention will be pointed out hereinafter and set forth in the appended claims forming part of the application.

In the accompanying drawing, a preferred embodiment of the invention is shown by way of illustration and not by way of limitation.

In the drawing:

Fig. 3 is a fragmentary front view partly in section of a tap spigot of the installation for dispensing two beverages either separately or in mixture, the section of Fig. 3 being taken on line 3—3 of Fig. 4.

Fig. 4 is a side view of Fig. 3 partly in section taken on line 4—4 of Fig. 3.

Fig. 5 is a section through the head of the spigot according to Figs. 3 and 4.

Fig. 6 is a section taken on line 6—6 of Fig. 5.

Fig. 7 is a section taken on line 7—7 of Fig. 5, and

Fig. 8 is a section taken on line 8—8 of Fig. 5.

Figure 1:
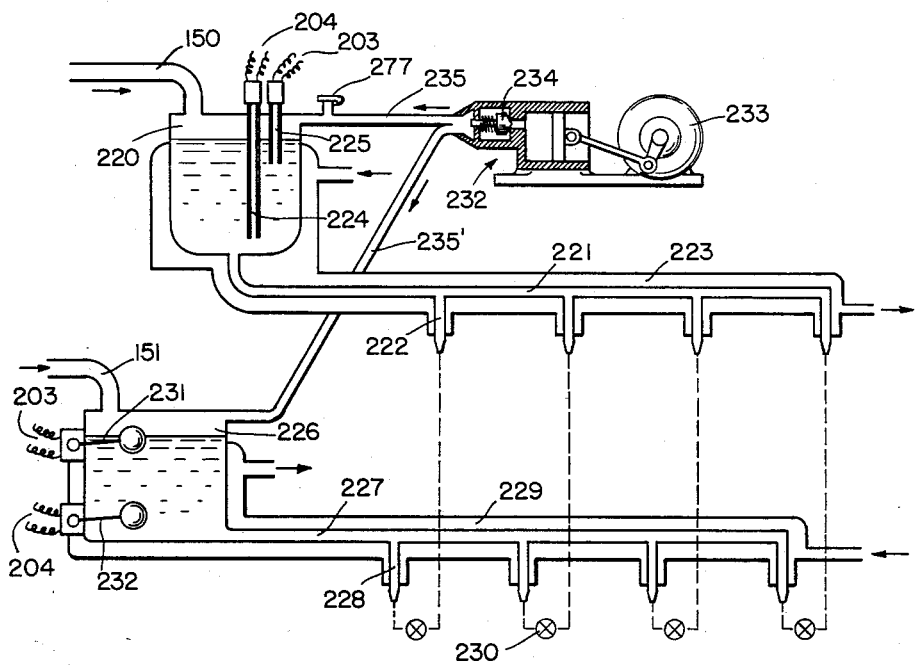
Fig. 1 is a partly diagrammatic view of an installation for dispensing several beverages either separately or in mixture.
Figure 2:
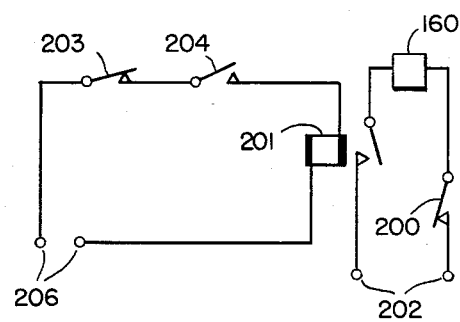
Fig. 2 is a circuit diagram of the control circuit forming part of the installation.

Referring first to Figs. 1 and 2, the upper part of the installation according to Fig. 1 shows means for dispensing one beverage and the lower part means for dispensing another beverage. The beverage dispensed from the upper dispensing means may be coffee or tea and the beverage dispensed from the lower means may be milk or cream. The coffee is supplied to the upper dispensing means through a feed pipe 150 from a suitable source of supply such as the coffee making machine described in my aforementioned co-pending application Serial No. 515,939, now Patent 2,827,845, and collected in a container 220. From this container extends a tap line 221 having a desired number of tap points of spigots 222. The storage container 220 and the tap line with the spigots are jacketed by a jacket 223 to circulate hot water or another heat medium for the purpose of maintaining the coffee at a suitable temperature. To control the flow of coffee through feed pipe 150 an upper and a lower probe 224 and 225 are provided. The two probes are shown as capacitance probes, that is two spaced electrodes are provided, the capacitance of the probes being determined by the level of the coffee in the container, due to the difference between the dielectric constant of coffee and air. Obviously other types of probes can also be provided such as photo cells which are activated by a beam of light which is cut off when the level of the beam is below the level of the coffee in the container. Probe 224 detects the lower level of the coffee and probe 225 the upper level. The capacitance of the probes is used to control switches 203, 204 in a manner well known to experts in the field and not essential for the understanding of the invention. Switches 203 and 204 are shown in the circuit diagram of Fig. 2 and included in the energizing circuit of a relay 201 which is connected to a suitable source of current 206. As is evident, the energizing circuit of relay 201 is completed only when both switches 203 and 204 are closed. The capacitance of probe 225 is so set that switch 203 controlled by it is always closed unless the upper level of the coffee in container 220 is above the pre-determined maximum level, that is, the switch is also closed when the electrodes of the probe are entirely surrounded by air. Accordingly probe 225 serves to prevent overfilling of the container. Switch 204 is normally open and closes only when the level of the coffee drops below a predetermined minimum level. Relay 201 when energized by the closing of both switches closes its contacts which are included in the energizing circuit of the equipment for supplying fresh coffee. This equipment is indicated by a block 160 as its arrangement is not essential for the understanding of the invention. It may be of the kind shown in the aforementioned co-pending application Serial No. 515,939, now Patent 2,827,845. Equipment 160 is connected to a source of current 202. A main switch 200 serves to disconnect the coffee supplying equipment.

The cream or milk is stored in a container 226 which is supplied through a feedpipe 151 from a suitable source. A tap line 227 having a desired number of taps 228 extends from container 226. A jacket 229 serves to circulate a coolant to keep the milk or cream at a suitable low temperature. Mixing faucets or spigots 230 are provided to dispense coffee mixed with cream or milk as desired.

The upper and lower level of the cream or milk in container 226 are controlled by floats 231 and 232 respectively. These floats control the supply of milk or cream by means of a control circuit of the kind shown in Fig. 2 and described in connection with the control of the coffee supply. This is indicated by referencing the two floats to switches 203 and 204.

As is evident, capacitance probes or photo cells may be used for container 226 also and similarly the floats may be used in container 220.

To produce the air pressure necessary for the discharge of coffee and milk or cream at the tap points, a continuously running air pump 233 is provided. The pump is shown as a rotary piston pump driven by a motor 233. The pump works against a spring loaded valve 234 through pipes 235 and 235' respectively. A relief valve 277 prevents the build-up of an excessive air pressure.

Figs. 3 through 8 describe a spigot suitable for use in conjunction with the dispensing means of Figs. 1 through 2.

The spigot of Figs. 3 through 8 is designed to dispense coffee and milk or cream only, and coffee and milk or cream simultaneously and in mixture.

The spigot as shown comprises a distributing head 280 into which lead a coffee pipe 236 and a milk or cream pipe 237. Each pipe is jacketed by jackets 238 and 239 respectively to permit heating of the coffee and cooling of the milk or cream respectively. The two jackets are heat insulated from each other by an interposed layer 240 of suitable insulation material. The pipes and the jackets associated therewith also form a supporting arm for head 280 as can best be seen in Fig. 4.

The spigot head comprises a generally cylindrical housing 241 within which are independently rotatable two drum like members 242 and 243. Drum 243 forms a container for a fixed volume of milk or cream. Its wall has an opening 244 which in the drum position of Fig. 6 registers with pipe 237 and a second opening 245 which in the said position faces the inner wall of housing 241 whereby it is closed. Upon rotation of drum 242 in counterclockwise direction as seen in Fig. 6, opening 244 is moved out of register with the supply pipe 237 and opening 245 is moved into register with a circumferential channel 246 provided in the inner wall of housing 241. Channel 246 is continued into a dispensing bore 247 in the spout 248 of head 280. A float valve 249 controlled by the liquid level in drum 242 controls the ingress of makeup air through a bore 250 to prevent a partial vacuum within the drum when the milk or cream is withdrawn therefrom.

Drum 243 is shown as being solid except for a bore 251 which in the position of Fig. 7 is in register with the coffee supply line 237. The drum is preferably made of heat insulating material to preserve the heat of the coffee and to protect the cold cream or milk from the hot coffee. The inner wall of housing 241 has two circumferentially extending channels 252 and 253. Channel 252 constitutes in effect an elongation of pipe 236 and channel 253 is continued into a coffee discharge bore 254 in spout 248. As can best be seen in Fig. 7, upon rotation of drum 243 in counterclockwise direction the end of bore 251 facing pipe 236 remains in registry with channel 252 but the opposite end of bore 251 facing the inner wall of housing 241 is moved into registry with channel 253 thereby connecting the supply pipe 236 with the discharge bore 254.

To protect the heat insulating material of drum 243 and to prevent any deterioration of the flavor of the coffee by extensive contact with the heat insulating material, a linner 255 and inserts 256 and 257 made of suitable protective material are preferably provided.

A return spring 258 such as a load spiral spring serves to retain drums 242 and 243 in the positions of Figs. 6 and 7 respecitvely, or to return the drums into these positions.

To operate the coffee dispensing drum 243 either independently of the cream or milk dispensing drum 242 or jointly therewith, a control and operating means 260 is provided. This means comprises a tubular member 261 which extends through a circumferentially elongated slot 262 into drum 243 and is secured therein by any suitable means such as thread 263. A shoe 264 laterally extending from tube 261 serves to guide the latter and to cover slot 262. A rod 265 disposed within tube 261 supports a lateral pin 266 which can ride either in a circumferential groove 267 provided in the inner wall of housing 241 and corresponding in length substantially to slot 262 or in an indentation 268 in the outer wall of drum 242. The outer end of rod 265 is secured to a handle or grip 269 fitted upon tube 261. A loaded spring 270 biases rod 265 into the position of Fig. 8 in which pin 266 is within groove 267.

To rotate the coffee dispensing drum 243 only from the position of Fig. 5 or Fig. 7 into the coffee dispensing position, handle 269 is rotated in counterclockwise direction as seen in Fig. 4. As can best be seen in Fig. 8, pin 266 will ride in groove 267 thereby leaving drum 242 stationary.

When it is desired to rotate drum 242 also into the milk or cream dispensing position, handle 269 is depressed while being rotated. As a result, pin 266 engages identation 268 so that drum 242 is compelled to follow the turning of handle 269 and drum 243.

The spigot further comprises means for rotating the milk dispensing drum only. These means are shown as a handle 271 secured by a boss 272 to drum 242 through the respective side wall of housing 241. A relief valve 273 within boss 272 permits the ingress of air into drum 242 when milk or cream is discharged therefrom either by means of handle 269 or handle 271.

While the invention has been described in detail with respect to a certain now preferred example and embodiment of the invention it will be understood by those skilled in the art after understanding the invention that various changes and modifications may be made without departing from the spirit and scope of the invention, and it is intended therefore, to cover all such changes and modifications in the appended claims.

What is claimed as new and desired to be secured by Letters Patent is:

1. An installation for dispensing several beverages selectively separate and mixed respectively, said installation comprising, in combination, a first storage vessel for storing one beverage, a second storage vessel for storing another beverage, a first tap pipe communicating with said first storage vessel, a second tap pipe communicating with said second storage vessel, each of said pipes having at least one tap point, and a mixing spigot communicating with both said tap pipes, said spigot comprising two drums each including a passage for the flow of the respective beverage through the drums, a drum casing housing said two drums rotatable relative to the casing and to each other, an inlet conduit and outlet conduit for each beverage communicating with said casing, the flow passage through each drum interconnecting one of the inlet and outlet conduits in one rotational position of the respective drum and disconnecting the conduits in another rotational position of the drum, said one position constituting a beverage dispensing position of the drum and said other position a shut-off position, and actuating means including an actuating member selectively engageable with one of said drums and both drums respectively for turning one or both drums into the respective dispensing position.

2. An installation according to claim 1, wherein each of said tap pipes is jacketed for circulating a heating fluid and a cooling fluid respectively to heat one of the said beverages and to cool the other, said jackets being disposed in side-by-side arrangement, and wherein heat insulating material is interposed between said two jackets.

3. An installation according to claim 1 and further comprising beverage level gauge means in each of said storage vessels for detecting a minimum level and a maximum level in each of said vessels, each of said level gauge means including a pair of probes fixedly mounted to extend into the respective vessel at different depths thereof, a beverage supply pipe communicating with each of said vessels, said gauge means being adapted to control the admission of beverage through the respective supply pipe so as to maintain the beverage level in each of said storage vessels between said maximum level and said minimum level.

4. An installation according to claim 3 and further comprising a control circuit means for controlling the flow of beverage through each of said supply pipes, said control circuit means including two switch means, one of said switch means being controlled by the respective upper probe to be opened when the beverage in the respective storage vessel is above the maximum level and the other switch means being controlled by the respective lower probe to be closed when the beverage in the respective storage vessel is below said minimum level, closing of both said switch means energizing said control circuit means for initiating the flow of beverage to the respective storage vessel.

5. An installation according to claim 1, and comprising spring loaded return means for returning the drums into the shut-off position upon release of said actuating member.

6. An installation according to claim 1, wherein one of said drums is a hollow drum to receive a predetermined volume of the respective beverage, the inlet conduit and the inlet end of the flow passage through said drum being in registry in the shut-off position of the drum and the corresponding outlet conduit and outlet end of the passage through said drum being in registry in the dispensing position whereby the dispensation of the beverage from said hollow drum upon movement thereof into the dispensing position is limited to the volume of beverage contained therein.

7. An installation according to claim 6, wherein the other of said drums has a flow passage in registry with the respective inlet and outlet conduit in the dispensing position of the drum and in positions intermediate the shut-off position whereby beverage is dispensed from said drum in continuous flow when the drum is in the dispensing position and the intermediate positions.

8. An installation according to claim 7, and comprising second actuating means for turning said hollow drum into the dispensing position and the shut-off position respectively independent of the position of the other drum.

References Cited in the file of this patent

UNITED STATES PATENTS

| | | |
|---|---|---|
| 1,375,363 | Carey et al. | Apr. 19, 1921 |
| 1,516,190 | Holderle et al. | Nov. 18, 1924 |
| 1,618,363 | Clark | Feb. 22, 1927 |
| 1,782,678 | Bronson et al. | Nov. 25, 1930 |
| 2,243,188 | Biach | May 27, 1941 |
| 2,372,360 | Cornelius | Mar. 27, 1945 |